United States Patent [19]

Lutz

[11] Patent Number: 4,923,303

[45] Date of Patent: May 8, 1990

[54] MEASURING DEVICE FOR LOCATION AND ATTITUDE DETERMINATION OF AN OBJECT

[75] Inventor: Reinhold Lutz, Bernhaupten, Fed. Rep. of Germany

[73] Assignee: Messerschmitt-Bölkow-Blohm Gmbh, München, Fed. Rep. of Germany

[21] Appl. No.: 298,265

[22] Filed: Jan. 17, 1989

Related U.S. Application Data

[63] Continuation-in-part of Ser. No. 19,034, Feb. 26, 1987, abandoned.

[30] Foreign Application Priority Data

Feb. 27, 1986 [DE] Fed. Rep. of Germany ....... 3606399

[51] Int. Cl.⁵ ................... G01S 1/70; G05D 3/14
[52] U.S. Cl. ................... 356/375; 250/561; 356/152
[58] Field of Search ............ 356/1, 375, 376, 152; 250/561

[56] References Cited

U.S. PATENT DOCUMENTS

| | | | |
|---|---|---|---|
| 3,727,055 | 4/1973 | David et al. | 356/375 |
| 3,746,452 | 7/1973 | Teboul et al. | 356/438 |
| 3,900,260 | 8/1975 | Wendt | 356/1 |
| 4,529,315 | 7/1985 | Cohen et al. | 356/400 |
| 4,576,481 | 3/1986 | Hansen | 356/373 |
| 4,582,424 | 4/1986 | Kawabata | 356/1 |

FOREIGN PATENT DOCUMENTS

| | | | |
|---|---|---|---|
| 0029255 | 3/1977 | Japan | 356/1 |
| 0132580 | 10/1981 | Japan | 356/7 |

*Primary Examiner*—Richard A. Rosenberger
*Attorney, Agent, or Firm*—Kenyon & Kenyon

[57] ABSTRACT

A measuring device for the location and attitude determination of an object, for example, of a space craft for the purpose of docking. At the object several light sources are located, each intensity-modulated with a different code frequency. Optics of the measuring device reproduce the object on a position-sensitive detector. On the basis of its output signals, the image coordinates of the light sources are computed by way of an evaluating device using a frequency multiplexing process.

3 Claims, 2 Drawing Sheets

MEASURING DEVICE FOR LOCATION AND ATTITUDE DETERMINATION OF AN OBJECT

This application is a continuation-in-part of application Ser. No. 019,034, filed Feb. 26, 1987, now abandoned.

BACKGROUND OF THE INVENTION

The present invention relates to a measuring device for the location and attitude determination of an object.

Such measuring devices are needed, for example, in space flights, when it becomes necessary to bring two space craft into close proximity in order to link one to the other and docking is only possible in an exactly predetermined attitude of the two craft with respect to each other. For this purpose, the relative location and attitude of one space craft must be determined from the approaching space craft, so that before the docking maneuver, possible required attitude corrections can be carried out. As deviations from the desired reference attitude, rotations as well as tilts with respect to the connecting line between the two bodies can occur.

SUMMARY OF THE INVENTION

The problem of exact location and attitude determination of an object, however, does not only exist in space travel, but, for example, also in automated manipulating systems, in which certain parts of the system must repeatedly approach certain other parts in a given orientation.

In particular, with an object which moves relative to the measuring device, it is frequently required that the location and attitude determination be carried out with high resolution as well as great measuring speed. This given task with respect to a measuring device of the previously mentioned kind is intended to be solved by the invention.

The above and other objects of the present invention are achieved by a measuring device comprising several light sources, located at the object, each intensity-modulated with different code frequencies, optics, which image the object with the light sources on a position-sensitive detector, and an evaluating device for computing the image coordinates of the light sources simultaneously from the output signals of the position-sensitive detector using a frequency multiplexing process.

An important aspect of the invention is the use of a so-called position-sensitive detector, which ensures high location resolution. The high measuring speed is achieved in that the light sources located at the object are intensity-modulated with different code frequencies and on the detector side a frequency multiplexing process is employed for evaluation. In this way, the positions of all light sources can be determined simultaneously.

A position-sensitive detector is a relatively extensive semiconductor diode, which, through appropriate doping, has perpendicular to its surface a p-i-n structure with the p and n layers built as thin surface layers with highly constant electric surface resistance. On these surface layers, pairs of electrodes opposite each other are applied, which preferentially have the form of straight strips. For example, such an electrode pair can be placed on the n-conducting upper side and another one on the p-conducting underside of the diode. However, it is also possible for two electrode pairs to be located on only one of the surfaces. For two-dimensional coordinate determination, both electrode pairs must be oriented perpendicular to each other. If such a position-sensitive detector is illuminated on any point of its surface between the electrode pairs oriented perpendicular to each other, charge carriers originate at this site which flow to the electrodes, given the assumption that between the electrode pairs a constant direct current is applied in the high-resistance direction. The voltage components flowing to the individual electrodes of a pair under the influence of this voltage are in each instance inversely proportional to the surface resistances between the illuminated point and the two electrodes. These surface resistances in turn are directly proportional to the distances of the illuminated points from the electrodes. In this manner, by measuring the partial currents, which are conducted by two electrode pairs oriented perpendicular to each other, the coordinates of an illuminated point can be determined precisely. It is of particular advantage in this connection that by this measuring method, the center of a light spot is determined. Therefore, it is not required, to reproduce an approximately punctiform light source with the aid of optics completely sharply focused on a position-sensitive detector in its focal plane; the position determination is also precise when focusing is not exact.

In addition to the use of a position-sensitive detector, it is important to the invention that on the object, the location and attitude of which needs to be determined, several light sources with distance between them, preferentially luminous diodes (LEDs), are located, which are each intensity-modulated with different code frequencies. The luminous sources operated in this way are reproduced by the optics on the position-sensitive detector in its focal plane. Accordingly, frequency-modulated partial currents arise there likewise, from which, in a subsequent evaluating device, the corresponding image coordinates of the light sources are computed. The frequency-coded intensity modulation of the light sources finds its equivalency by using a frequency multiplexing process which is tuned to the used code frequencies. In such a way it becomes possible to determine the local coordinates of the light source image points simultaneously, on the basis of which the relative location and attitude of the object with respect to the camera containing the optics as well as the detector is subsequently obtained since the arrangement of the light sources on the object is known.

BRIEF DESCRIPTION OF THE DRAWINGS

The invention will be explained in greater detail in the following detailed description with reference to the drawings, in which.

DETAILED DESCRIPTION

Figure 1A:
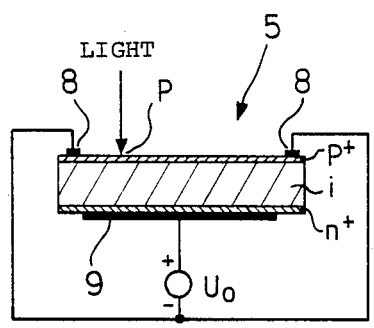
FIGS. 1a, 1b and 1c show, respectively, a position-sensitive detector in cross section, a top plan view of the detector, and an equivalent electric circuit.
Figure 1B:
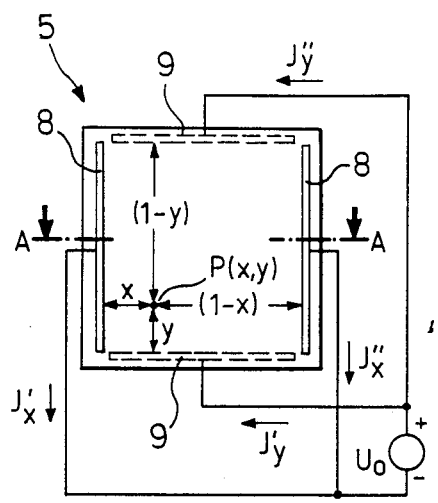

FIG. 1a shows a position-sensitive detector (PSD=position sensitive detector) 5 in cross section (along line A—A of FIG. 1b). The position-sensitive detector 5 has the structure of a diode, by virtue of the fact, that in an initially intrinsic semiconductor body in the form of a thin disk, the upper and the lower surface layers are each oppositely doped. This describes the approximate way in which the represented p$^+$ in$^+$ structure is formed. The intrinsic semiconductor material can be, for example, silicium or another material used customarily in the production of semiconductor diodes. According to FIGS. 1a and 1b, two strip-like electrodes 8 forming one electrode pair are located on the upper side of the detector 5 facing the incident light. On the underside of the detector 5, two additional strip-like electrodes 9, also forming an electrode pair, are applied, and with respect to their orientation, perpendicular to the electrode pair 8. Both electrode pairs 8 and 9 are placed at the margins of the surface layers. The $p^+$- as well as the $n^+$-conducting surface layers have a highly uniform electric surface resistance. To the diode, given by the $p^+$ i $n^+$ structure, a constant direct current voltage $U_o$ is applied in the high-resistance direction. If no light falls on the detector 5, only negligible dark currents flow. If at a point P there is incident light on the surface of detector 5, it will be absorbed below point P in the i-layer and electric charges are set free there (electron hole pairs). These are then suctioned by the applied direct current voltage $U_o$ in the direction of the electrodes 8, 9. In this way, a current distribution over the electrodes results, which is a function of the position of point P (x,y) in the cartesian system of coordinates (x, y) defined by the strip-like electrodes 8, 9, in which the origins of the coordinates of the system are in the lower left hand corner of the electrode square of FIG. 1b, and the coordinates x, y can assume values between 0 and 1. The partial currents $J'_x$ as well as $J''_x$ flowing from point P (x, y) over the two electrodes 8 are inversely proportional to the surface partial resistances Rx as well as R(1−x) between this point P and the electrodes 8. For the partial currents $J'_x$ and $J''_x$, the following can be calculated, where R is the surface resistance between the two electrodes of the electrode pair 8:

$$J''_x = \frac{\frac{1}{(1-x)R}}{\frac{1}{(1-x)R} + \frac{1}{xR}} J = xJ$$

$$J'_x = (1 - x) J$$

Correspondingly, the same is true for the partial currents $J'_y$ as well as $J''_y$. By obtaining sums, differences, as well as quotients of the measured partial currents, the following expressions can readily be formed:

$$S_x = \frac{J''_x - J'_x}{J''_x + J'_x}, S_y = \frac{J''_y - J'_y}{J''_y + J'_y}$$

where between the quotients $S_x$, $S_y$ as well as the coordinates x and y the following relation exists:

$$S_x = 2x - 1 \quad S_y = 2y - 1$$

On the basis of these expressions, the coordinates x and y can be readily calculated.

Figure 1C:
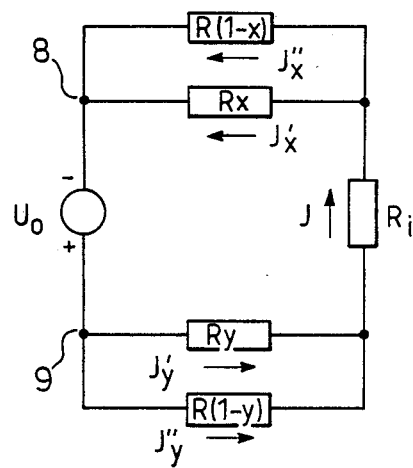

FIG. 1c represents a kind of equivalent circuit diagram for the position-sensitive detector 5. The applied direct voltage $U_o$ is initially applied at the electrode pairs 9 and 8 symbolized by common connecting points. Between the electrode pair 9 on the underside of the detector 5 and the point of the $n^+$ layer subjacent to point P, the two surface partial resistances Ry as well as R(1−y) are located. Then follows an internal resistance $R_i$ which indicates the leak resistance in the i-layer in the region of point P. The circuit closes over the surface partial resistances Rx as well as R(1−x) connected in parallel as well as the electrode pair 8 located on the upper surface of the detector 5.

The total current J, which flows over the internal resistance $R_i$ divides into the particular partial currents $J'_y$, $J''_y$, and $J'_x$ and $J''_x$.

With a position-sensitive detector, an embodiment of which is shown in FIG. 1, the coordinates of not only one but also several illuminated points can be measured simultaneously, if the illumination is intensity-modulated with different frequency codes in each instant. Then direct currents pulsating with the corresponding frequencies are obtained, which initially superimpose at the electrodes and subsequently must be separated from each other again in a frequency multiplexing process. This takes place, for example, in the manner shown in FIG. 2.

Figure 2:
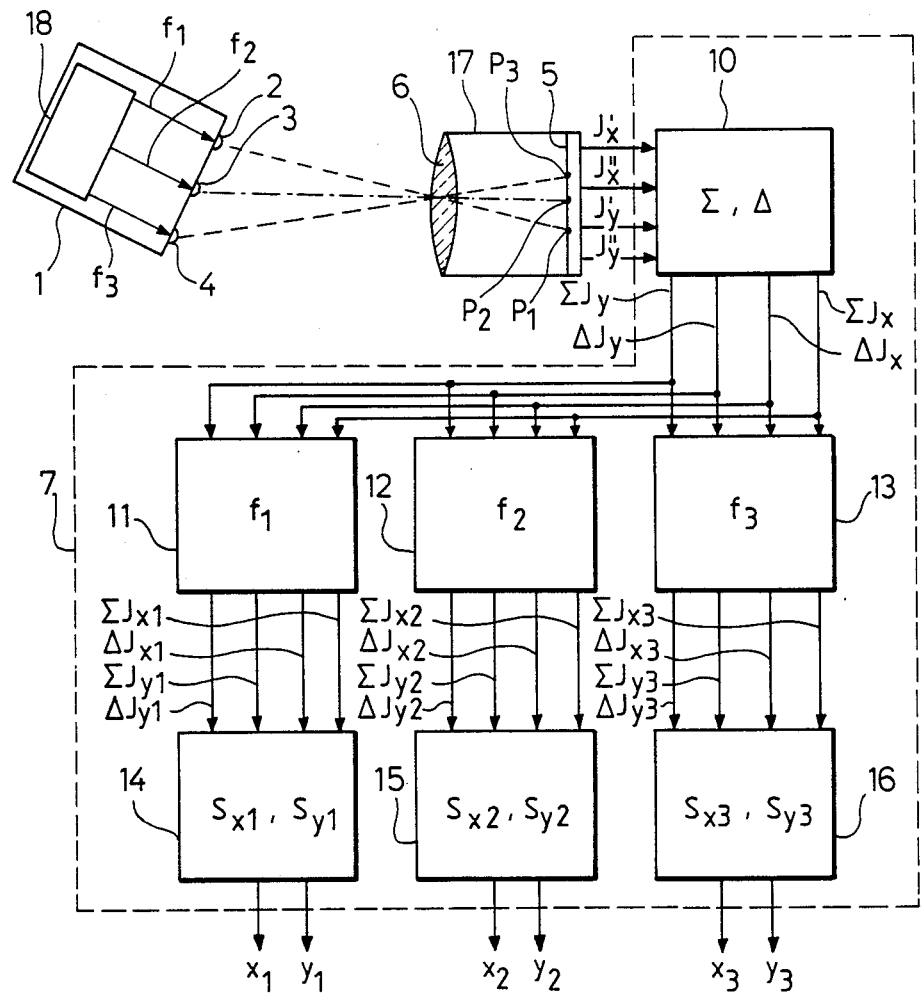
FIG. 2 is the block diagram of a measuring device according to the invention.

FIG. 2 represents an object 1, the location and attitude of which needs to be determined, a camera 17 with optics 6 and a position-sensitive detector 5 in its focal plane, and an evaluating device 7. On the outside of the object 1 are, for example, three light sources 2, 3, and 4, possibly luminous diodes, mounted in a way which depends on the surface shape of the object 1. The intensity of the luminous sources 2, 3, and 4 is modulated with three different frequencies $f_1$, $f_2$ and $f_3$ with the aid of a modulator 18, which can be located in the object 1. The light sources 2, 3, and 4 are image by the optics 6 of the camera 17 on the surface of the position-sensitive detector 5, whereby image points $P_1$, $P_2$ and $P_3$ are created. Not shown in FIG. 2 are the direct voltage source $U_o$ for the detector 5 as well as the measuring devices for the partial currents $J'_x$, $J''_x$, $J'_y$ and $J''_y$ (see FIG. 1c). The corresponding measuring signals, which are superimposed pulsating direct currents, are transmitted to an evaluating device 7, which computes using a frequency multiplexing process the image coordinates $x_1$, $y_1$, and $x_2$, $y_2$ and $x_3$, $y_3$ of the image points $p_1$, $p_2$ and $p_3$ of the light sources 2, 3, and 4.

The evaluating device 7 may comprise of a summing element 10, frequency-selective filters 11, 12, and 13, and computing units 14, 15, and 16. The summing element 10 forms the sums and differences of the four partial currents. These are subsequently supplied simultaneously to three frequency-selective filters 11, 12, and 13, which are tuned to the narrow-band modulation frequencies $f_1$, $f_2$, and $f_3$. At the outputs of these frequency-selective filters, the sums and differences of the partial currents referring to the individual image points $P_1$, $P_2$, and $P_3$ are obtained simultaneously. Finally, the computing units 14, 15, and 16 form from the sums and differences the quotients $S_{x1}$, $S_{y1}$ etc., from which the above mentioned coordinates $x_1$, $y_1$ etc. of the image points can be easily computed and output. The image points can be displayed on a monitor for viewing subsequent to these steps, represented on a plotter or stored.

The measuring device is obviously not limited to the use of only three light sources, but rather, the number of light sources will depend on the complexity of the surface structure of the object 1. The number of frequency-selective filters required as well as the other computing units will depend on the number of light sources used. The frequency-selective filters as well as the computing units can, of course, be combined in a single multiplexer respectively or a single computing unit.

A variant of the described measuring device consists in omitting independently light-emitting light sources but instead illuminating the object point-like in several places, for example, with laser light, where this illumination must be intensity-modulated with different code frequencies. Instead of the active light sources, the optics 6 reproduces in this case the intensity-modulated and frequency-coded reflecting light spots on the object surface on the position-sensitive detector. All else takes place as described above.

The measuring device according to the invention is distinguished by high precision as well as simultaneous unambiguous identification of several light sources. Their signals traverse largely the same signal processing components. Drift effects, thus, do not appear as relative errors of the coordinate values of individual luminous sources relative to each other. The noise equivalent bandwidth of the demodulation (frequency multiplexing process) can be selected very small depending on the required measuring speed. In this way, a correspondingly large signal-to-noise ratio is obtained which determines directly the resolution of the measuring device. Through suitable demodulation, interference sources are completely suppressed. They, therefore, have no influence on the resolution or the measuring accuracy of the process.

For frequency-coded intensity modulation, rectangular pulses with the pulse frequencies 1000, 1700 or 2400 Hz can be used, for example. The achievable resolution of the detector is approximately 0.01 $\mu$m. Interference sources with a thousandfold intensity of the luminous sources have not been shown to influence the accuracy of the coordinate measuring techniques. The detector surfaces are of the order of magnitude of approximately 100 mm$^2$. The measuring device has been tested for distances ranging from 20 cm to 200 m.

In the foregoing specification, the invention has been described with reference to specific exemplary embodiments thereof. It will, however, be evident that various modifications and changes may be made thereunto without departing from the broader spirit and scope of the invention as set forth in the appended claims. The specifications and drawing are, accordingly, to be regarded in an illustrative rather than in a restrictive sense.

What is claimed is:

1. A measuring device for the location and attitude determination of an object, comprising a plurality of light sources disposed on the object, optical means for reproducing the object with the light sources on a position-sensitive detector, the position-sensitive detector comprising two electrode pairs which define a coordinate system on the detector surface and generating partial electric currents, each of the plurality of light sources being intensity-modulated with a different code frequency, and evaluating means for computing simultaneously the image coordinates of the light sources from the partial electric currents of the position-sensitive detector using a frequency multiplexing process.

2. The measuring device recited in claim 1, wherein the evaluating means comprises on an input side a summing means for forming the sum and the difference of the partial electric currents of each of the two electrode pairs and a plurality of frequency-selective filters connected in parallel to each other downstream from the summing means, each frequency-selective filter being adjusted to another one of the code frequencies.

3. The measuring device recited in claim 2, further comprising a plurality of computing units coupled to the frequency-selective filters for computing the image coordinates of the light sources from the selected sum and difference signals.

* * * * *

UNITED STATES PATENT AND TRADEMARK OFFICE
CERTIFICATE OF CORRECTION

PATENT NO. : 4,923,303

DATED : May 8, 1990

INVENTOR(S) : Reinhold Lutz

It is certified that error appears in the above-identified patent and that said Letters Patent is hereby corrected as shown below:

```
In Column 2, lines 8,9, change "...constant direct current"
       to read --...constant direct voltage...-- lines 9,10, change "The voltage components..."
       to read --The current components..--

Column 4, line 28, change "...sources 2,3 and 4 are
       image..." to read --...sources 2,3 and 4 are
       imaged...--
```

Signed and Sealed this

Thirteenth Day of August, 1991

Attest:

HARRY F. MANBECK. JR.

Attesting Officer

Commissioner of Patents and Trademarks